Dec. 8, 1936.  G. G. GILPIN  2,063,671
PROCESS AND PRODUCT OF WELDING GALVANIZED IRON SHEETS
Filed Nov. 15, 1935

INVENTOR:
Garth G. Gilpin
HIS ATTORNEYS.

Patented Dec. 8, 1936

2,063,671

UNITED STATES PATENT OFFICE 2,063,671

PROCESS AND PRODUCT OF WELDING GALVANIZED IRON SHEETS

Garth G. Gilpin, Riverside, Ill., assignor to P. H. Murphy Company, New Kensington, Pa., a corporation of Pennsylvania Application November 15, 1935, Serial No. 49,923

8 Claims. (Cl. 219—10)

The problem of welding galvanized iron sheets involves special difficulties that have heretofore made it impracticable to weld such sheets industrially. The principal difficulty arises from the fact that the spelter or zinc, which constitutes the protective coating on the iron, melts at a temperature below the welding temperature with the result that the welding heat causes the spelter to run off and leave the iron unprotected. Another serious difficulty is that the melted spelter is liable to mix with the welding metal and form therewith an alloy of little strength or else puff up the welding metal into a porous and weak weld. The principal object of the present invention is to overcome these difficulties and devise a practicable process for welding galvanized iron sheets. The invention consists principally in a process of welding wherein the spelter coating is preserved unimpaired and the weld metal is protected from admixture with the spelter. It also consists in the seam construction hereinafter described.

In the accompanying drawing wherein like reference numerals refer to like parts wherever they occur, Fig. 1 is a diagrammatic view of two galvanized iron sheets in process of welding in accordance with my invention;

Figure 1:
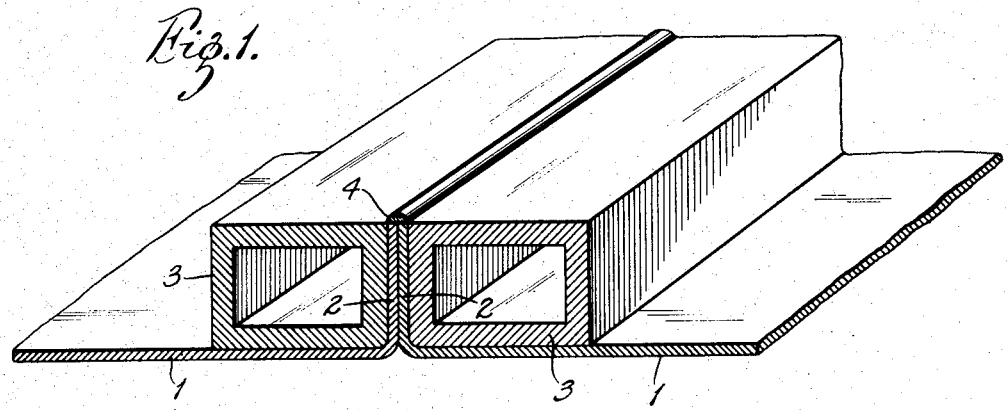
Figure 2:
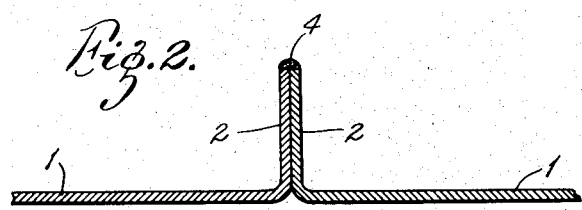
Fig. 2 is a detail view of the finished seam.

According to the present invention, the adjacent marginal portions of the galvanized iron sheets 1 to be welded together are formed into upstanding flanges 2. The sheets are then placed alongside each other with their marginal flanges upstanding and abutting and with the top edges of the flanges substantially flush or at the same level. The sheets are held firmly down and clamped together by means of thick blocks 3 whose sides fit flatwise against the upper portion of the sides of the flanges and preferably reach to the top thereof. These blocks are preferably made of copper because it takes up and dissipates the heat rapidly and because the spelter does not adhere thereto. Preferably, the blocks are made hollow and have the interior thereof connected to a suitable source of supply of cooling fluid, which runs through the blocks in a continuous stream.

While the flanges 2 of the galvanized sheets 1 are thus firmly clamped together between the copper blocks 3, they are welded together with added metal 4 deposited thereon from a welding rod by the electric arc method. The arc is moved along the flanges as rapidly as practicable, that is, as rapidly as the molten weld metal can be deposited properly on the iron edges of the flanges. The object in depositing the weld metal rapidly is to limit the heating effect on the galvanized sheets, so far as practicable, to the edge portions of the flanges and thereby prevent melting of the spelter. To accomplish this result, it is advisable, with thick sheets, to deposit the weld metal in instalments, that is, by making a thin deposit in a first operation and increasing the thickness of the deposit by repeating the operation after the temperature incident to the first operation is lowered.

On account of the copper blocks bearing against the upper portion of the sides of the flanges, they serve as shields to protect the sides of the flanges from direct exposure to the heat of the arc and they also serve to rapidly absorb and dissipate the heat that passes through the flanges by conduction. If the spelter at the sides of the flanges should melt, it cannot run off because it is prevented by the copper blocks; and consequently, it is redeposited in its old position without impairment of the protective coating. It is especially noted that on account of the flanges standing in a vertical position, the tendency of the spelter, when melted, is to run down the sides of the flanges and away from the weld. Consequently, the weld metal remains free from admixture with the spelter and thus forms a strong weld with the uncoated iron edges of the sheets.

My invention is particularly applicable to car roofs wherein it is especially desirable to use galvanized iron roof sheets and connect them by standing seams. Although such roof sheets are rather thin, the present process makes it feasible to weld the iron edges of the flanges together and still leave the spelter coating extending up to the weld. Thus, the seam is water tight and, when a stainless steel alloy is used for the weld metal, it is strong and resistant to rusting and corrosion and serves to protect the ungalvanized edges of sheets that are trimmed after being galvanized. It is noted also that, on account of the flanges being thoroughly clamped together and shielded by the copper blocks from direct exposure to the arc, together with the rapidity with which the weld metal is deposited and the flanges are cooled, such flanges are prevented from distorting and the resulting seam stands up in proper shape and position.

Figure 3:
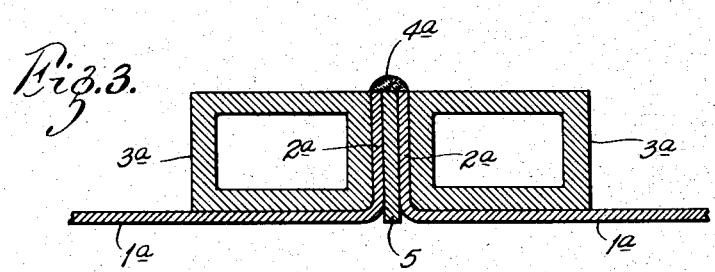
Figs. 3 and 4 are views similar to Fig. 1 showing sheets and structural elements welded together in accordance with my invention.
Figure 4:
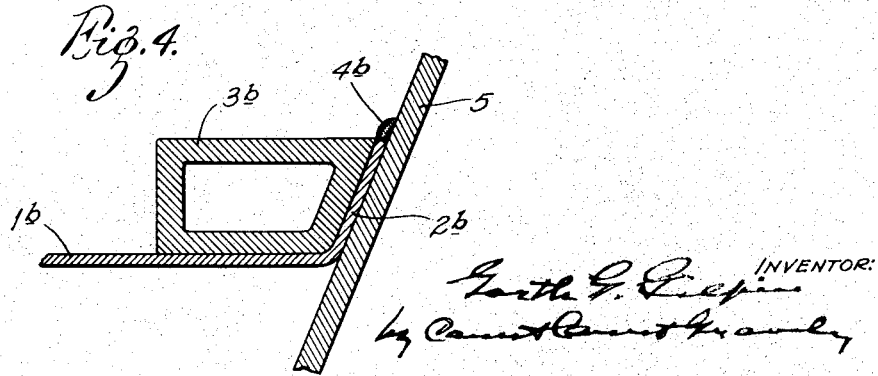

While my process is especially adapted for the welding together of two galvanized iron sheets to form a standing seam, it is also applicable to other arrangements and to the welding of a galvanized sheet to structural elements, such, for instance, as illustrated in Figs. 3 and 4. In the construction illustrated in Fig. 3, the structural element comprises a strip 5 of metal, which is interposed between the upstanding, marginal flanges 2a of galvanized sheets 1a and serves as a reinforcement for the upstanding seam. The flanges 2a are held in contact flatwise with the member 5 with their upper edges flush with the upper edge of said member by means of copper blocks 3a, which shield the flanges from direct exposure to the heat and take up and dissipate the heat rapidly, and the flanges and the member clamped therebetween are secured together along their upper margins by a single weld 4a. In the construction illustrated in Fig. 4, the marginal portion 2b of the galvanized sheet 1b is held and protected by a block 3b of copper or other material that will take up and dissipate the heat rapidly, and the welding metal is applied to the uncoated iron edge of the galvanized sheet as above described. If the structural element 5 is not coated, the marginal portion of the galvanized sheet may abut flatwise against the body portion thereof, in which case, the weld 4b will fill the angle between the edge of the sheet and the body portion of the structural element. This application of the weld is especially important around openings in roofs, as were upstanding flanges of sheets are welded to the sides of the hopper of a refrigerator car.

While it is desirable to have the margins of the sheets in an upright position during the operation of welding, it is not necessary in cases where adequate precautions are taken to prevent the spelter getting into the weld, the most important precautions being that the blocks shall protect the coated surface up to the weld and that the duration of exposure to the heat shall be minimized.

The term "iron", as used herein, is intended to include steel.

What I claim is:

1. The process of joining a galvanized iron sheet to another metal element which comprises arranging the marginal portion of the galvanized iron sheet in an upright position and in contact with the other element, covering the coated side of said marginal portion up to the edge thereof with a clamping and cooling shield to protect it from the heat and prevent melting and flow of the spelter coating, and then depositing weld metal only on the uncoated iron edge of the sheet and the adjacent portion of the other element, said weld metal being free from spelter.

2. The process of welding galvanized sheets together which comprises clamping the marginal portions of the sheets together flatwise in an upstanding position and with their edges substantially flush, protecting the coated side surfaces of said marginal portions from exposure to the source of welding heat, and welding only the uncoated edges of the sheets together with weld metal deposited thereon.

3. The process of welding galvanized iron sheets which consists in forming upstanding flanges along the margins thereof, clamping the upper portions of said flanges together with copper blocks whose top surfaces reach substantially to the top edges of said flanges, and then rapidly applying weld metal only to the uncoated iron edges by the arc welding method.

4. The process of welding the upstanding flanges of galvanized iron sheets together and to a metal element disposed therebetween which comprises clamping said flanges and said metal element together flatwise with their edges substantially flush, protecting the coated side surfaces from direct exposure to the welding heat, and welding said edges of said flanges and said element together with weld metal deposited thereon.

5. The combination of two galvanized iron sheets having upstanding flanges along their adjacent margins, and a weld of added metal joining together the iron edges of said sheets, said weld being free from spelter and the rest of the iron being coated with spelter that reaches to said weld.

6. The combination of two galvanized iron sheets having upstanding flanges along their margins that have sheared ungalvanized edges, and a weld of added, rust-resisting metal joining together the ungalvanized edges of said flanges, said weld metal being free from spelter.

7. The combination of two galvanized iron sheets having upstanding flanges, a metal element disposed between said flanges, and a weld of added metal joining together the edges of said sheets and said element, the rest of said flanges being coated with spelter that reaches to said weld.

8. The combination of two galvanized iron sheets having upstanding flanges, a metal element disposed between said flanges, and a weld of added metal joining the iron edge of each flange to said metal element, the rest of said flanges being coated with spelter that reaches to said weld.

GARTH G. GILPIN.